US008317591B1

(12) United States Patent
Vergelli

(10) Patent No.: US 8,317,591 B1
(45) Date of Patent: Nov. 27, 2012

(54) METHOD FOR GENERATING NUMBERS FOR LOTTERY GAMES

(76) Inventor: Gian Piero Vergelli, Surfside, FL (US)

( * ) Notice: Subject to any disclaimer, the term of this patent is extended or adjusted under 35 U.S.C. 154(b) by 12 days.

(21) Appl. No.: 13/168,620

(22) Filed: Jun. 24, 2011

(51) Int. Cl.
*G06F 17/00* (2006.01)

(52) U.S. Cl. .......................................................... 463/17

(58) Field of Classification Search ............... 463/16–25
See application file for complete search history.

(56) References Cited

U.S. PATENT DOCUMENTS

| | | | | |
|---|---|---|---|---|
| 7,798,896 | B2 * | 9/2010 | Katz et al. | 463/20 |
| 8,241,100 | B2 * | 8/2012 | Katz et al. | 463/16 |
| 2007/0129144 | A1 * | 6/2007 | Katz et al. | 463/30 |
| 2008/0132327 | A1 | 6/2008 | Coutts | |

OTHER PUBLICATIONS www.winner-lotto.com/LongSpain.php.

* cited by examiner

*Primary Examiner* — Ronald Laneau
(74) *Attorney, Agent, or Firm* — Albert Bordas, P.A.

(57) ABSTRACT

A method for generating numbers for lottery games that works out a series of cases providing optimized lotto numbers for different lottery wheels, achieving up to about 500% or more improvement in comparison against other systems. The optimal generating system for lottery games created for the Lottery Players provides a study on how to increase their chance of winning Lottery Prizes more frequently. The system of the present invention is used for generating very special number combinations, the final numbers representing a system of combinations that achieve the Maximum Possible "Coverage".

1 Claim, 1 Drawing Sheet

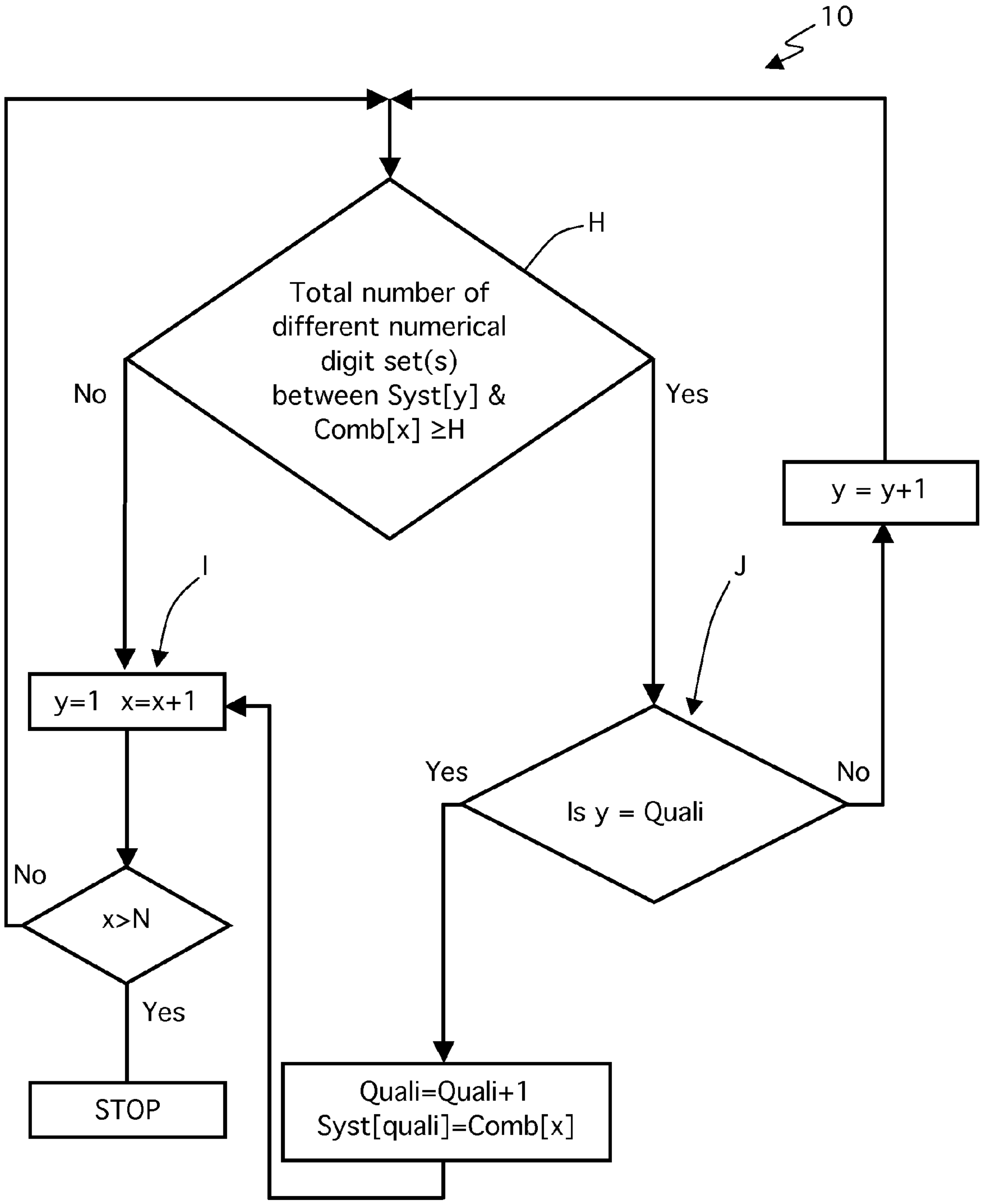
10
H
Total number of different numerical digit set(s) between Syst[y] & Comb[x] ≥H
No
Yes
y = y+1
I
J
y=1 x=x+1
Yes
No
Is y = Quali
No
x>N
Yes
STOP
Quali=Quali+1
Syst[quali]=Comb[x]

METHOD FOR GENERATING NUMBERS FOR LOTTERY GAMES

BACKGROUND OF THE INVENTION

1. Field of the Invention

The present invention relates to number generating systems, and more particularly, to an optimal generating system for lottery games.

2. Description of the Related Art

Applicant believes that the closest reference corresponds to U.S. Patent Application Publication No. 20080132327, published on Jun. 5, 2008 to Coutts for a method and article of manufacture for making lottery selections. However, it differs from the present invention because Coutts teaches a method of generating a group of numbers, which is usable as selections for a lottery. The method comprises obtaining a first set of numbers, receiving an indication to generate the group of numbers, generating the group of numbers and then displaying the group of numbers. The group of numbers that is generated excludes numbers belonging to the first set of numbers and the group of numbers has the characteristic that the difference between the number of occurrences of a first number in the group of numbers and the number of occurrences of a second number in the group of numbers is at most one.

Several overseas National Lotteries offer their users with a System to play. One of the closest references corresponds to the Spanish Lottery, which offers a system comprising all possible combinations of 8 chosen numbers, resulting in 28 combinations to play. A chart, also published by the inventor of the instant invention, at www.winner-lotto.com/Long-Spain.php, of a Comparison Chart between the Spanish System and the present invention's 28 Combination System. The chart shows many matches in the present invention, with the average frequency of matching about every 3 draws.

The Players of the mentioned Spanish System usually must wait for months (sometimes over a year) before they win any prize. However, with the optimal generating system for lottery games of the present application, the clients may not win the big prizes very often, but at least they would enjoy the satisfaction of circling more winning numbers. It is frustrating for Players to wait up to over a year for at least a small prize, normally the sad Player would stop playing, giving up all the hopes. One of the objects of the present invention is to help Players to find hope.

At this moment, there are Companies on the web that advertise how to increase such frequency by generating special number combinations by using different methods. Other Companies related with the subject matter advertise on the web how to increase such frequency by generating special number combinations. However, they provide for a number of more or less complicated features that fail to solve the problem in an efficient way. No prior art has been found that would create a full system of optimal numbers for the lottery, and Applicant is not aware of any prior art that suggests the novel features of the present invention.

SUMMARY OF THE INVENTION

It is one of the main objects of the present invention to provide a method for generating numbers for lottery games.

It is another object of the present invention to provide a method for generating numbers for lottery games intended to fill number boxes, rather than "quick pick" boxes.

It is yet another object of this invention to implement such a method while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 is a flow chart of a method for generating numbers for lottery games.

DETAILED DESCRIPTION OF THE PREFERRED EMBODIMENT

Referring now to the drawing, the present invention is generally referred to with numeral 10 and is a method for generating numbers for lottery games, comprising the steps of:

A) inserting sequential whole numbers within a computer comprising at least one database system to define a sequential whole number set having whole numbers (W).

In step A), an example of the sequential whole numbers is: 1, 2, 3, 4, 5, 6, 7, 8, 9, 10, 11, 12, 13, 14, 15, . . . (W). As an example, in a preferred embodiment, (W) can be any number typical for lottery games such as 48, or 49, or 50, or 51, or 52, or 53 etc. However, (W) can be any number. A computer comprising at least one database system will also have adequate software to operate instant invention 10. Adequate software can include a database program as an example.

B) defining a quantity (q) of the whole numbers (W) to establish a game set (z), the game set (z) is less than the whole numbers (W).

In step B), an example of the quantity (q) can be 6 numbers. Meaning that of total W numbers, quantity (q), 6, are picked, to make a game set (z). (q) can be any number, (z) can be any number.

C) defining a first array, the first array is all possible combinations (N) of the whole numbers (W) using the quantity (q) and not repeating any of the whole numbers (W), the first array defined as comb [set] comprising comb [x], whereby [x]=1 to N;

In step C), an example of the first array with W=53, and game set (z)=6 is:

| | | | |
|---|---|---|---|
| 1, 2, 3, 4, 5, 6 | 1, 2, 3, 4, 5, 11 | 1, 2, 3, 4, 5, 16 | 1, 2, 3, 4, 5, 21 |
| 1, 2, 3, 4, 5, 7 | 1, 2, 3, 4, 5, 12 | 1, 2, 3, 4, 5, 17 | 1, 2, 3, 4, 5, 22 |
| 1, 2, 3, 4, 5, 8 | 1, 2, 3, 4, 5, 13 | 1, 2, 3, 4, 5, 18 | 1, 2, 3, 4, 5, 23 |
| 1, 2, 3, 4, 5, 9 | 1, 2, 3, 4, 5, 14 | 1, 2, 3, 4, 5, 19 | : |
| 1, 2, 3, 4, 5, 10 | 1, 2, 3, 4, 5, 15 | 1, 2, 3, 4, 5, 20 | 48, 49, 50, 51, 52, 53 |

D) defining a system array, the system array defined as a qualified combination(s) system [set] comprising syst [y].

E) defining Quali as a number of qualified combination(s).

F) defining that syst [1] is defined as a first of the number of qualified combination(s) when [y]=1.

As a constant, syst [1] is the first of the number of qualified combination(s), whereby syst [1] is equal to comb [1]. Therefore, syst [1] is: 1, 2, 3, 4, 5, 6.

G) defining a hamming distance, the hamming distance will be a number equal or greater than two, but less than the quantity (q).

The hamming distance will never be 1. The hamming distance is either: 2, 3, 4, or 5. For the example below, a hamming distance of 3 is used.

H) identifying a total number of different numerical digit set(s) by comparing digits of the comb [x], whereby [x]=2, to the syst [y], whereby the [y]=1;

As seen in FIG. 1, for step H) a total number of different numerical digit set(s) are identified by comparing digits of the comb [x], whereby [x]=2, to the syst [y], whereby the [y]=1. As an example:

| | |
|---|---|
| comb[1] = 1, 2, 3, 4, 5, 6 | syst[1] = 1, 2, 3, 4, 5, 6 |
| comb[2] = 1, 2, 3, 4, 5, 7 | |

Comparing comb[2] to syst[1]; digits 1, 2, 3, 4, and 5 of comb [2] are identical to 1, 2, 3, 4, and 5 of syst [1]; and there is only 1 total number of different numerical digit set(s), digit 7 of comb [2] is different to digit 6 of syst [1].

I) determining if the total number of different numerical digit set(s) are not equal or greater in quantity than the hamming distance, then the [x]=[x+1], and the [y]=1, if the [x] is greater than the all possible combinations (N), then stop.

As seen in FIG. 1, for step I) determining that the total number of different numerical digit set is 1 because digit 7 of comb [2] is different to digit 6 of syst [1]. 1 is not equal or greater than the hamming distance of 3. Therefore [x]=[x+1], and the [y]=1, if the [x] is greater than the all possible combinations (N), then stop.

Example

| | |
|---|---|
| comb[1] = 1, 2, 3, 4, 5, 6 | syst[1] = 1, 2, 3, 4, 5, 6 |
| [x] = [x + 1], and | [y] = 1 |
| comb[2] = 1, 2, 3, 4, 5, 7 | syst[1] = 1, 2, 3, 4, 5, 6 |
| [x] = [x + 1], and | [y] = 1 |
| comb[3] = 1, 2, 3, 4, 5, 8 | syst[1] = 1, 2, 3, 4, 5, 6 |
| [x] = [x + 1], and | [y] = 1 |
| comb[4] = 1, 2, 3, 4, 5, 9 | syst[1] = 1, 2, 3, 4, 5, 6 |
| [x] = [x + 1], and | [y] = 1 |
| comb[5] = 1, 2, 3, 4, 5, 10 | syst[1] = 1, 2, 3, 4, 5, 6 |
| [x] = [x + 1], and | [y] = 1 |
| comb[6] = 1, 2, 3, 4, 5, 11 | syst[1] = 1, 2, 3, 4, 5, 6 |
| [x] = [x + 1], and | [y] = 1 |
| comb[7] = 1, 2, 3, 4, 5, 12 | syst[1] = 1, 2, 3, 4, 5, 6 |
| [x] = [x + 1], and | [y] = 1 |
| etc . . . until | |

J) determining if the total number of different numerical digit set(s) are equal or greater in quantity than the hamming distance of 3.

As seen in FIG. 1, Step J), when the total number of different numerical digit set(s) are equal or greater in quantity than the hamming distance of 3, then determine if the [y] qualifies as a qualified combination(s).

It is noted that for [y] to qualify as a qualified combination(s), the total number of different numerical digit set(s) must be equal or greater in quantity than the hamming distance of 3 as compared to the respective comb[x] and all intervening respective syst[y].

If [y] is not yet equal to the number Quali, increase [y] by one and go back checking the hamming test with the new value of syst[y] (the qualifying tests are from [y]=1 to [y]=Quali), and proceed to step H), When [y] does equal the number of qualified combination(s), then the number of qualified combination(s) increases by one, and the number of qualified combination(s) increased by one equals total respective number from the comb[x] and proceed to step I).

Example

| | | |
|---|---|---|
| comb[1] = 1, 2, 3, 4, 5, 6 | syst [1] = 1, 2, 3, 4, 5, 6 | Quali = 1 |
| [x] = [x + 1], and | [y] = 1 | |
| comb[2] = 1, 2, 3, 4, 5, 7 | syst [1] = 1, 2, 3, 4, 5, 6 | |
| [x] = [x + 1], and | [y] = 1 | |
| comb[3] = 1, 2, 3, 4, 5, 8 | syst [1] = 1, 2, 3, 4, 5, 6 | |
| [x] = [x + 1], and | [y] = 1 | |
| comb[4] = 1, 2, 3, 4, 5, 9 | syst [1] = 1, 2, 3, 4, 5, 6 | |
| [x] = [x + 1], and | [y] = 1 | |
| comb[5] = 1, 2, 3, 4, 5, 10 | syst [1] = 1, 2, 3, 4, 5, 6 | |
| [x] = [x + 1], and | [y] = 1 | |
| comb[6] = 1, 2, 3, 4, 5, 11 | syst [1] = 1, 2, 3, 4, 5, 6 | |
| [x] = [x + 1], and | [y] = 1 | |
| comb[7] = 1, 2, 3, 4, 5, 12 | syst [1] = 1, 2, 3, 4, 5, 6 | |
| [x] = [x + 1], and | [y] = 1 | |
| comb[n] = 1, 2, 3, 7, 8, 9 | syst[n − 1] = 1, 2, 3, 7, 8, 9 | Quali = 2 |
| etc. | | |

Comparing comb[n] to syst[1]; digits 1, 2, and 3 of comb [n] are identical to 1, 2, and 3 of syst[1], and there are 3 total number of different numerical digit set(s), digits 7, 8, 9 of comb [n] are different to digits 4, 5, 6 of syst [1]. Therefore [y] equals the number of qualified combination(s), and the number of qualified combination(s) increases by one to Quali=2.

Steps I and J are then repeated until the [x] is greater than the all possible combinations (N), whereby comb[N] is reached.

Therefore, instant invention 10 is a method for generating numbers for lottery games, comprising the steps of:

A) inserting sequential whole numbers within a computer comprising at least one database system to define a sequential whole number set having whole numbers (W);

B) defining a quantity (q) of said whole numbers (W) to establish a game set (z), said game set (z) is less than said whole numbers (W);

C) defining a first array, said first array is all possible combinations (N) of said whole numbers (W) using said quantity (q) and not repeating any of said whole numbers (W), said first array defined as comb [set] comprising comb [x], whereby [x]=1 to N;

D) defining a system array, said system array defined as a qualified combination(s) system [set] comprising syst [y];

E) defining Quali as a number of qualified combination(s);

F) defining that syst [1] is defined as a first of said number of qualified combination(s) when [y]=1;

G) defining a hamming distance, said hamming distance will be a number equal or greater than two, but less than said quantity (q);

H) identifying a total number of different numerical digit set(s) by comparing digits of said comb [x], whereby [x]=2, to said syst [y], whereby said [y]=1;

I) determining if said total number of different numerical digit set(s) are not equal or greater in quantity than said hamming distance, then said [x]=[x+1], and said [y]=1, if said [x] is greater than said all possible combinations (N), then stop; and J) determining if said total number of different numerical digit set(s) are equal or greater in quantity than said hamming distance, when said total number of different numerical digit set(s) are equal or greater in quantity than said hamming distance, then determine if said [y] qualifies as said qualified combination(s), for said [y] to qualify as said qualified combination(s), said total number of different numerical digit set(s) must be equal or greater in quantity than said hamming distance as compared to a respective said comb[x] and all intervening respective said syst[y], when said [y] does not qualify as a said qualified combination(s), then said [y]=[y+1], and proceed to step H), when said [y] does said quality it equals said number of qualified combination(s), then said number of qualified combination(s) increases by one, and said number of qualified combination(s) increased by one equals total respective number from said comb[x] and proceed to step I).

As an example, a lotto system is a group of elements interacting with one another. An example of a small lotto system comprises a group of only two (2) elements (combinations). A one-member-combination cannot qualify as a system because it misses any interaction.

To summarize and as an example, we use a short nine (9)-number Lotto wheel, with two (2) players, each staking two (2) combinations.

Player A starts with a combination 1-2-3-4-5-6. Player A changes 6 with 7 to use as a second combination: Player A fills the two following combinations with 1-2-3-4-5-6 and 1-2-3-4-5-7.

Player B also starts to take 1-2-3-4-5-6, but replacing three numbers in the second combination: Player B fills the two following combinations with 1-2-3-4-5-6 and 1-2-3-7-8-9.

As six (6) numbers are drawn from the wheel, all 26 following combinations below (if drawn) differ by 1 number from either one of the two Player A's combinations:

| | | | | |
|---|---|---|---|---|
| 1-2-3-4-5-8 | 1-2-3-4-5-9 | 1-2-3-4-6-7 | 1-2-3-4-6-8 | 1-2-3-4-6-9 |
| 1-2-3-4-7-9 | 1-2-3-5-6-7 | 1-2-3-5-6-8 | 1-2-3-5-6-9 | 1-2-3-5-7-8 |
| 1-2-3-5-7-9 | 1-2-4-5-6-7 | 1-2-4-5-6-8 | 1-2-4-5-6-9 | 1-2-4-5-7-8 |
| 1-2-4-5-7-9 | 1-3-4-5-6-7 | 1-3-4-5-6-8 | 1-3-4-5-6-9 | 1-3-4-5-7-8 |
| 1-3-4-5-7-9 | 2-3-4-5-6-7 | 2-3-4-5-6-8 | 2-3-4-5-6-9 | 2-3-4-5-7-8 |
| 2-3-4-5-7-9 | | | | |

A different result occurs with the six (6) numbers filled by Player B: all 36 following combinations below (if drawn) differ by 1 number from either one of the two Player B's combinations:

| | | | | |
|---|---|---|---|---|
| 1-2-3-4-5-7 | 1-2-3-4-5-8 | 1-2-3-4-5-9 | 1-2-3-4-6-7 | 1-2-3-4-6-8 |
| 1-2-3-4-6-9 | 1-2-3-5-6-7 | 1-2-3-5-6-8 | 1-2-3-5-6-9 | 1-2-4-5-6-7 |
| 1-2-4-5-6-8 | 1-2-4-5-6-9 | 1-3-4-5-6-7 | 1-3-4-5-6-8 | 1-3-4-5-6-9 |
| 2-3-4-5-6-7 | 2-3-4-5-6-8 | 2-3-4-5-6-9 | 1-2-3-4-8-9 | 1-2-3-5-8-9 |
| 1-2-3-6-8-9 | 1-2-3-4-7-9 | 1-2-3-5-7-9 | 1-2-3-6-7-9 | 1-2-3-4-7-8 |
| 1-2-3-5-7-8 | 1-2-3-6-7-8 | 1-2-4-7-8-9 | 1-2-5-7-8-9 | 1-2-6-7-8-9 |
| 1-3-4-7-8-9 | 1-3-5-7-8-9 | 1-3-6-7-8-9 | 2-3-4-7-8-9 | 2-3-5-7-8-9 |
| 2-3-6-7-8-9 | | | | |

The 36 hits with Player B's combinations are about 40% more than the 26 hits of Player A's combinations. In the present optimal generating system for lottery games, the hamming distance is defined as the quantity of unequal numbers in a pair.

For example, the hamming distance of System A (1-2-3-4-5-6 and 1-2-3-4-5-7) is 1, as there is only one quantity of unequal numbers in the last pair (6 and 7). In system B, the unequal pairs are 3 (4 and 7, 5 and 8, 6 and 9), therefore hamming distance=3. As seen in the above trivial example, the higher is hamming distance, the higher is the coverage of matches (coverage is 26 when hamming distance=1, coverage is 36 when hamming distance=3).

Extrapolating to more wheel numbers than nine (9), present invention 10 works out a series of cases providing optimized lotto numbers for different lottery wheels, achieving up to about 500% or more improvement in comparison against other systems.

A software package have been developed to run a simulation program, by writing a Visual Basic Studio platform. Basically, the simulator checked that every newly additional combination would qualify to belong to the system only if all the combinations paired with the newly arrived show equal or higher hamming distance.

The optimal generating system for lottery games created for the Lottery Players provides a study on how to increase their chance of winning Lottery Prizes more frequently. The system of the present invention is used for generating very special number combinations, the final numbers representing a system of combinations that achieve the Maximum Possible "Coverage".

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A method for generating numbers for lottery games using a computer, comprising the steps of:

A) inserting sequential whole numbers within said computer comprising at least one database system to define a sequential whole number set having whole numbers (W);

B) defining a quantity (q) of said whole numbers (W) to establish a game set (z), said game set (z) is less than said whole numbers (W);

C) defining a first array, said first array is all possible combinations (N) of said whole numbers (W) using said quantity (q) and not repeating any of said whole numbers (W), said first array defined as comb [set] comprising comb [x], whereby [x]=1 to N;

D) defining a system array, said system array defined as a qualified combination(s) system [set] comprising syst [y];

E) defining Quali as a number of qualified combination(s);

F) defining that syst [1] is defined as a first of said number of qualified combination(s) when [y]=1;

G) defining a hamming distance, said hamming distance will be a number equal or greater than two, but less than said quantity (q);

H) identifying a total number of different numerical digit set(s) by comparing digits of said comb [x], whereby [x]=2, to said syst [y], whereby said [y]=1;

I) determining if said total number of different numerical digit set(s) are not equal or greater in quantity than said hamming distance, then said [x]=[x+1], and said [y]=1, if said [x] is greater than said all possible combinations (N), then stop; and J) determining if said total number of different numerical digit set(s) are equal or greater in quantity than said hamming distance, when said total number of different numerical digit set(s) are equal or greater in quantity than said hamming distance, then determine if said [y] qualifies as said qualified combination(s), for said [y] to qualify as said qualified combination(s), said total number of different numerical digit set(s) must be equal or greater in quantity than said hamming distance as compared to a respective said comb[x] and all intervening respective said syst[y], when said [y] does not qualify as a said qualified combination(s), then said [y]=[y+1], and proceed to step H), when said [y] does said quality it equals said number of qualified combination(s), then said number of qualified combination(s) increases by one, and said number of qualified combination(s) increased by one equals total respective number from said comb[x] and proceed to step I).

* * * * *